United States Patent [19]
Dammar

[11] 3,927,843
[45] Dec. 23, 1975

[54] ARMATURE WINDING MACHINE WITH IMPROVED LEAD RETAINING MEANS

[75] Inventor: Raymon H. Dammar, Minneapolis, Minn.

[73] Assignee: Possis Corporation, Minneapolis, Minn.

[22] Filed: Oct. 1, 1973

[21] Appl. No.: 402,616

Related U.S. Application Data

[60] Division of Ser. No. 130,649, April 2, 1971, which is a continuation-in-part of Ser. No. 721,805, April 16, 1968, abandoned.

[52] U.S. Cl. .......................... 242/7.05 B; 29/205 C
[51] Int. Cl.² ......................................... H02K 15/09
[58] Field of Search ..... 242/7.05 B, 7.05 R, 7.05 C, 242/7.03; 29/205 C, 598; 140/92.1

[56] References Cited
UNITED STATES PATENTS

| | | | |
|---|---|---|---|
| 3,142,890 | 8/1964 | Adams et al. ............................ | 29/598 |
| 3,506,864 | 4/1970 | Miller .......................... | 242/7.05 B X |
| 3,673,878 | 7/1972 | Biddison ......................... | 242/7.05 B |

*Primary Examiner*—Billy S. Taylor

[57] ABSTRACT

An armature winding machine having wire gripping means to grasp the stretch of wire leading from each of its pair of flyers to the commutator tang to which the ending lead of the last of the coils wound by the flyer is attached, and retain its grasp thereon during the interval the just-wound armature is replaced with another armature core assembly and at least until the wire in its grasp is attached to the commutator tang which is to have attached thereto the starting lead of the series of coils that will be wound by the flyer, and having a tubular retaining member that moves to and from a position encircling the commutator and projecting into the hook-like commutator tangs to hold the wires looped thereabout against displacement, so that the wire in the grasp of the wire gripping means at the start of the winding operation can be, and is, severed directly after it has been attached to the starting lead tang.

6 Claims, 15 Drawing Figures

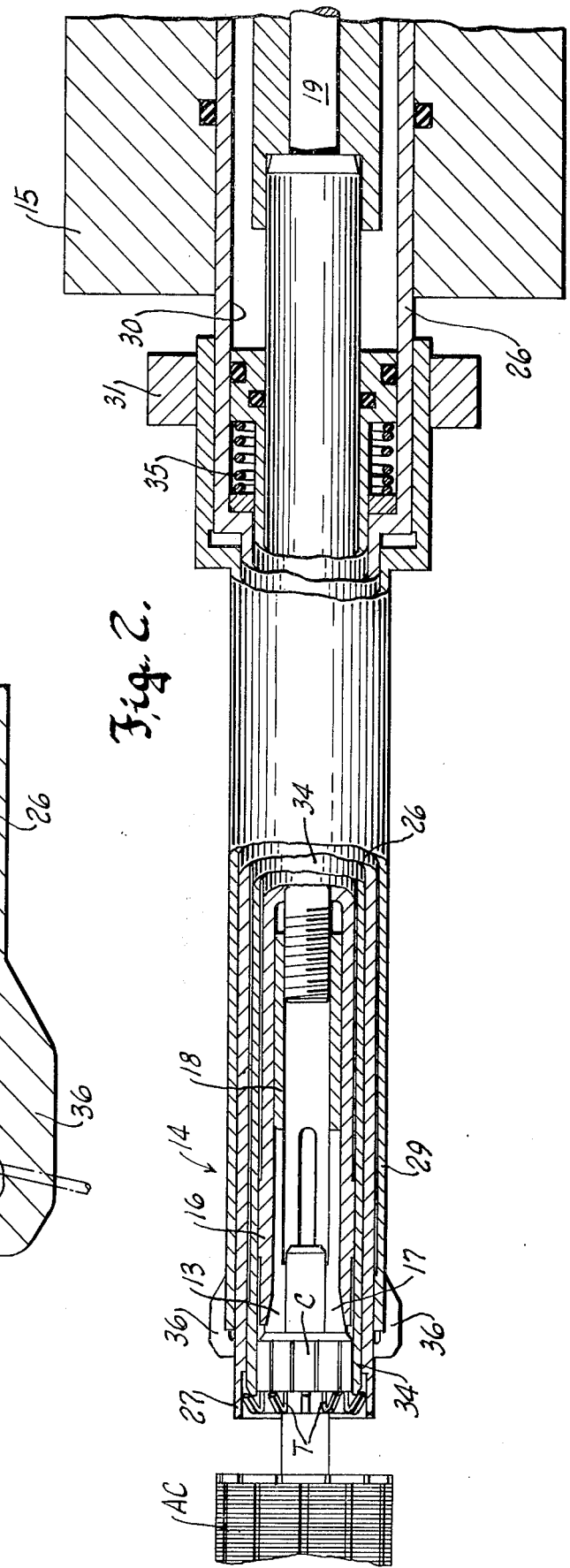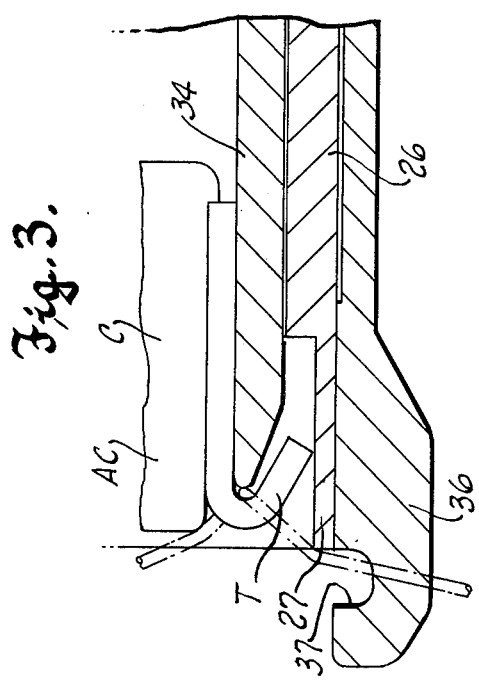

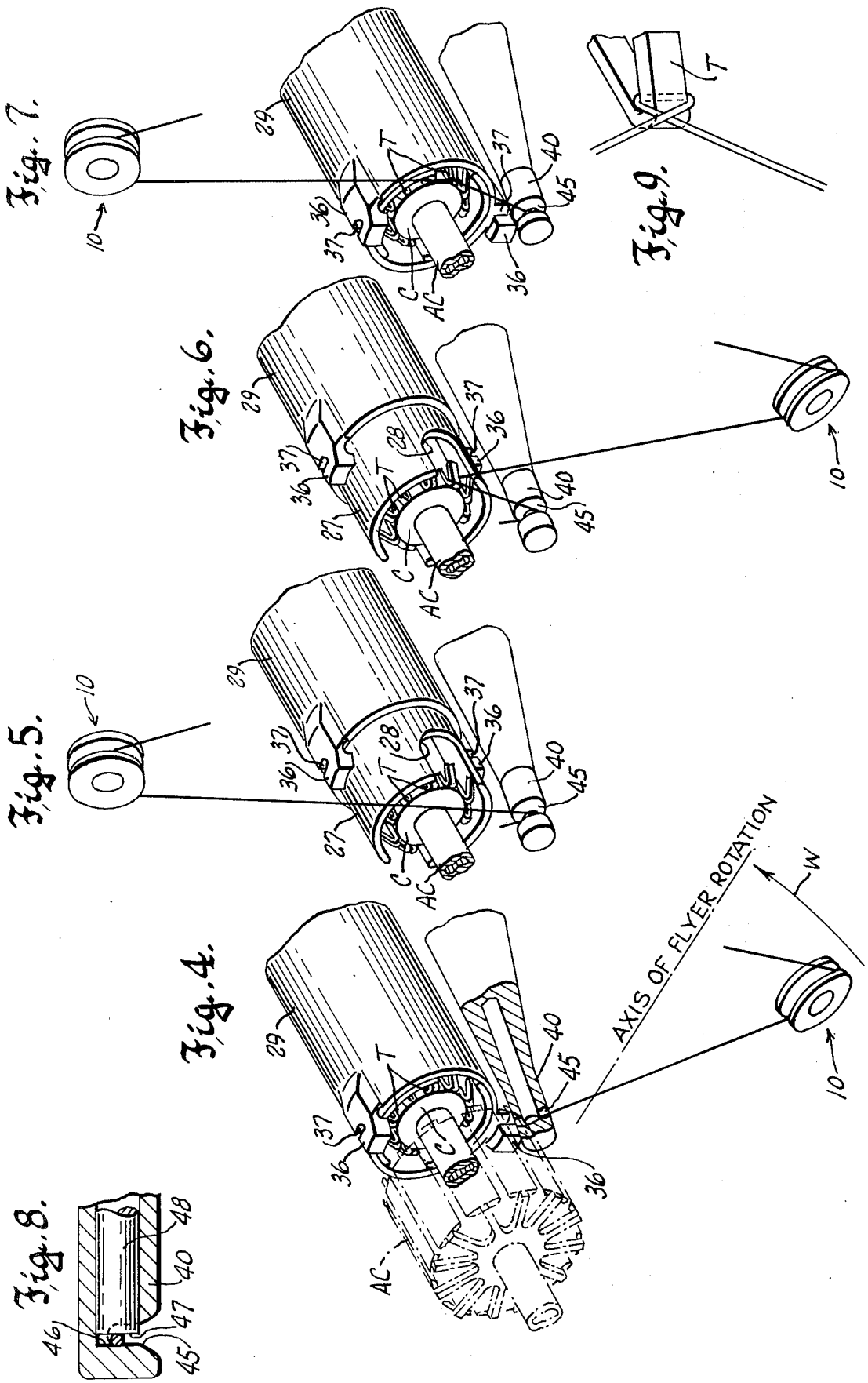

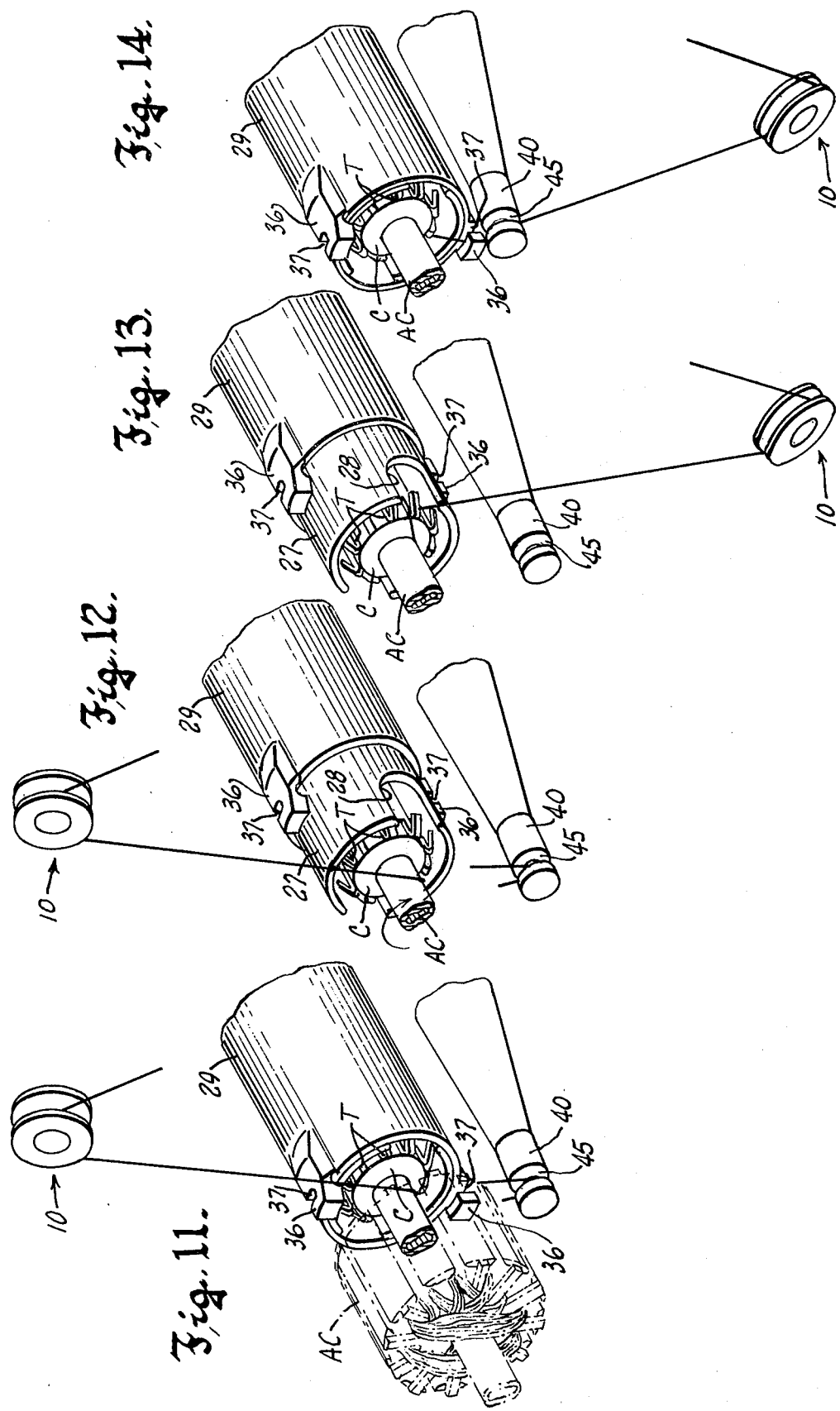

ARMATURE WINDING MACHINE WITH IMPROVED LEAD RETAINING MEANS

This invention, like that of the copending application Ser. No. 130,649, filed Apr. 2, 1971, of which this is a division, and which in turn was a continuation-in-part of Ser. No. 721,805, filed Apr. 16, 1968, and now abandoned relates to coil winding machines of the type employed to automatically wind coils of wire into angularly spaced slots of armature cores, and also automatically attach the leads that extend to and from those coils to the terminals or tangs of commutators associated with the armature cores.

Briefly summarized, the winding machine of this invention has suitable core holding means by which an armature core assembly is held in position to be wound; a pair of flyers rotatable about an axis substantially intersecting and normal to the axis of the armature core assembly in position to be wound, to wind wire drawn from a source thereof into pairs of angularly spaced core slots; commutator tang shielding means to prevent unintended engagement of the wire with the commutator tang; wire gripping means to grip the stretches of wire leading from the flyers to the core upon completion of the last coils wound onto the armature core and cessation of coil winding rotation of the flyers; wire cutting means in juxtaposition to the wire gripping means to sever the stretches of wire held by the wire gripping means with the cuts located between the wound armature core and the wire gripping means, so that upon severance of those wires the wound armature can be removed from the machine and replaced with another core assembly, while the wire gripping means retain their holds upon the ends of the wire leading from the flyers in preparation for the winding of the next succeeding armature core; the gripping means being actuated to release the ends of the wires in their grasp after winding of the next succeeding armature core is begun.

In the winding machine with which this invention is concerned, the wires outwardly of the commutator tangs to which the starting leads of the armature winding are attached - as well as the wires outwardly of the tangs to which the ending leads are attached - are severed directly adjacent to their respective commutator tangs, so that when the wound armature is removed from the winding machine, there are no dangling wires to be trimmed off. The apparatus by which this is achieved forms the subject matter of the aforesaid application Ser. No. 130,649, and the method by which it is done is claimed in the copending application Ser. No. 342,551, filed Mar. 22, 1973, as a division of Ser. No. 130,649.

The invention of the instant divisional application concerns the manner in which the leads, and especially the starting lead, are held against displacement from the commutator tangs during the winding of the armature, and has as its purpose the provision of improved lead retaining means which, during operation of the machine, moves into the hook-like tangs of the commutator and thereby holds the wire leads that are looped around the tangs against displacement.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which:

FIG. 2 is a side view with parts broken away and in section, of that part of the structure of the machine shown in FIG. 1, by which the armature core assembly is held in winding receiving position;

FIG. 3 is a fragmentary detail view in section and at an enlarged scale, of part of the front end portion of the structure shown in FIG. 2;

FIGS. 4, 5, 6 and 7 are perspective views of the core holding and commutator shielding structure, with a core in position therein and illustrating successive steps in the attachment of the starting lead to one of the commutator tangs preparatory to the winding of the first of the series of coils wound onto the armature core by one of the flyers;

FIG. 8 is a fragmentary detail sectional view through the wire gripping means;

FIG. 9 is a perspective view illustrating the attachment of the starting lead to its respective tang;

FIGS. 11, 12, 13 and 14 are perspective views similar to FIGS. 4–7 and 10, but showing the sequence of events which occurs during severance of the ending leads at the conclusion of the armature winding operation.

Figure 1:
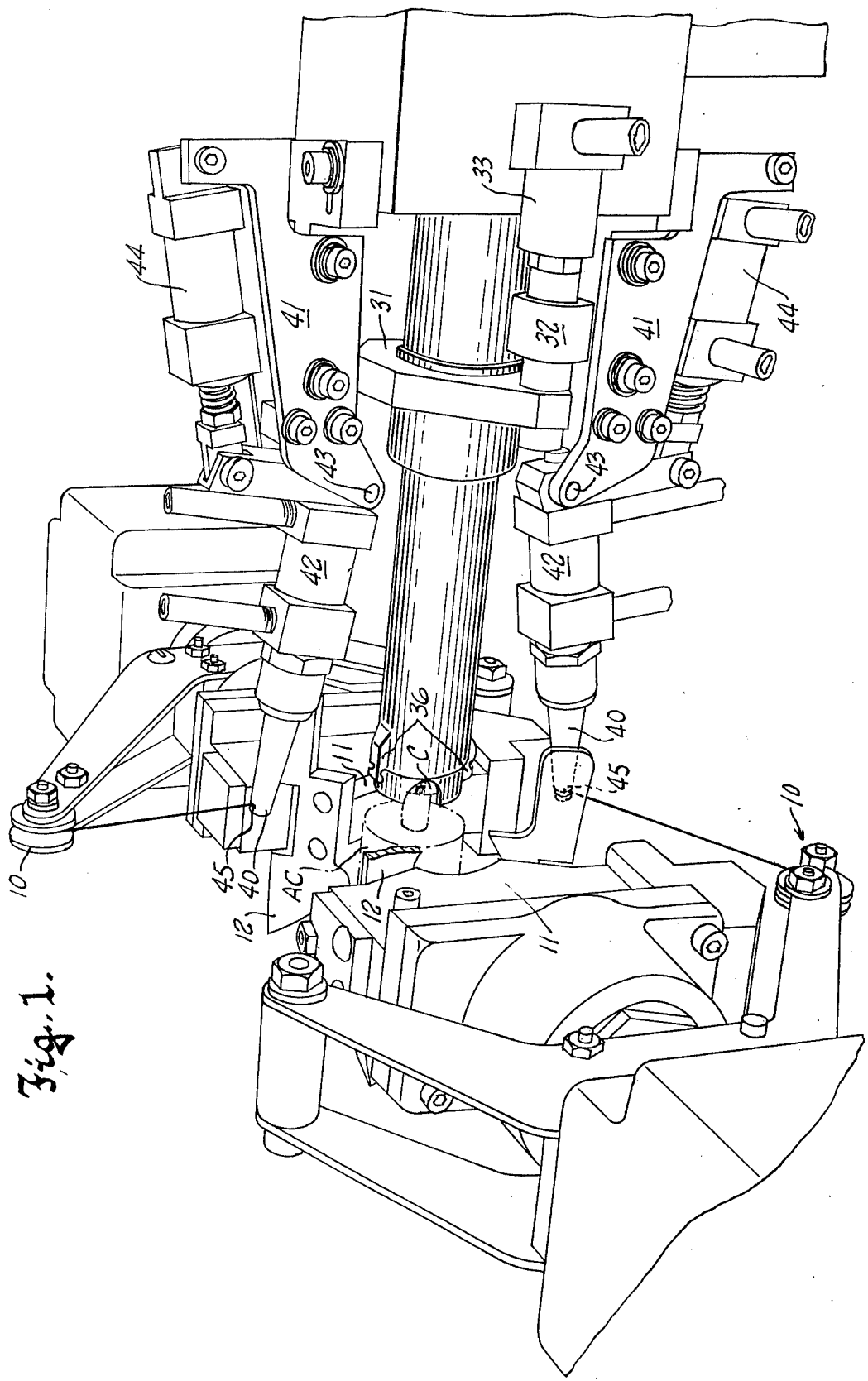
FIG. 1 is a perspective view of those portions of an armature winding machine requiring illustration to depict the present invention.

Referring now more particularly to the accompanying drawings in which like numerals designate like parts throughout the several views, the numeral 10 designates each of the pair of flyers which, as is customary in winding machines of the type here under consideration, are mounted for rotation about a common axis that intersects and is normal to the axis of an armature core assembly AC in position to have coils wound onto its slotted core. The term "armature core assembly" is used herein to denote the combination of the slotted core which usually consists of a stack of laminations, the commutator C of the armature and the shaft on which both are mounted, as distinguished from the wound or completed armature.

The flyers rotate in opposite directions and their circular orbits lie in parallel planes equispaced from the axis of the armature core assembly in position to be wound. Also, as is customary in armature winding machines of the type here involved, the slotted core of the assembly is embraced by a pair of shrouds 11 during the winding operation, which shrouds cover all but the two pairs of angularly spaced core slots into which the rotating flyers are to wind coils; and to guide the wire into these paired slots, the shrouds 11 have wings 12 which function in the conventional manner to guide the stretches of wire leading from the flyers into the uncovered core slots.

In this machine, the armature core — though embraced by the shrouds 11 — is held in position to be wound by core holding or gripping means 13 (FIG. 2) which forms part of a combined core rotating and commutator shielding unit, indicated generally by the numeral 14. This unit projects forwardly from a stationary part 15 of the machine frame. The core holding portion of the unit is a conventional collet by which one end portion of the armature shaft is gripped after the core assembly has been manually placed in position.

Figure 15:
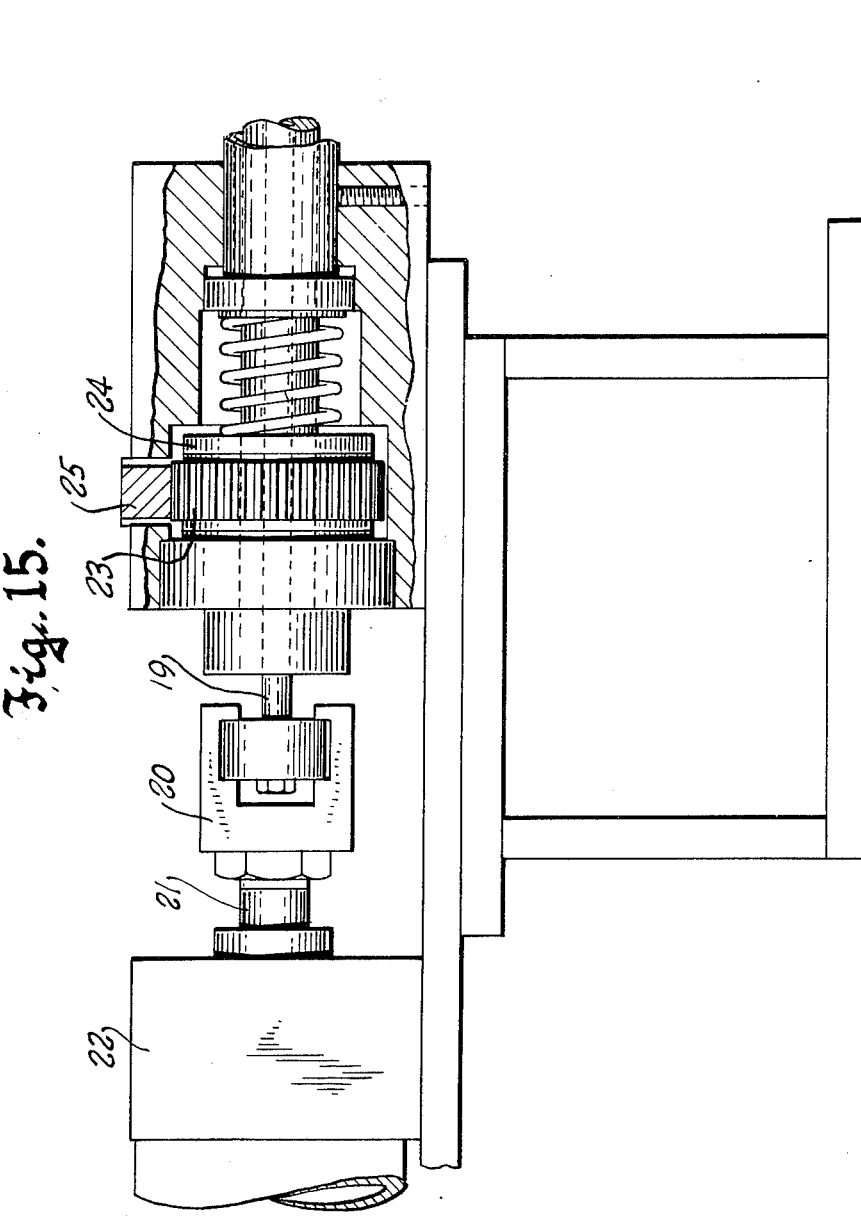
FIG. 15 is a side view with parts thereof broken away and in section, of the mechanism by which the core holding means is actuated.

The collet of the core holding or gripping means consists of an outer tubular element 16 with a tapered socket in its outer end in which the jaws 17 of the collet are received, the latter being provided by the taperingly enlarged outer split end of an inner tubular shaft 18. Hence upon insertion of the armature core shaft into the mouth of the collet jaws and rearward displacement of the shaft 18, the armature core assembly is tightly gripped by the collet. A rod 19 threaded into the rear end of the tubular shaft 18, upon being shifted endwise, opens or closes the collet, depending upon the direction in which it is shifted. The manner in which the rod 19 is reciprocated — though it forms no part of this invention — is illustrated in FIG. 15 which shows the rod 19 connected through a rotation accommodating coupling 20 with the piston 21 of an air cylinder 22. Obviously, by controlling the admission of air pressure to the cylinder, the collet can be actuated to grip or release the shaft of an armature core assembly.

FIG. 15 also illustrates the structure by which rotation is imparted to the collet, and hence an armature core assembly in its grasp. For this purpose, a gear 23 is mounted on the outer tubular element 16 of the collet and drivingly connectable thereto through a conventional unidirectional clutch indicated by the numeral 24, so that rotation of the gear 23 by reciprocation of a rack 25 in one direction, imparts rotation to the collet, while during movement of the rack in the opposite direction, the collet is held against turning. In this manner, indexing rotation is imparted to an armature core assembly in the grasp of the collet.

The means for reciprocating the rack to effect indexing of the armature core assembly has not been illustrated, since it forms no part of this invention and can be of any conventional type.

Referring particularly to FIG. 2, it will be seen that the coacting elements of the collet are inside and coaxial with a tube 26 which extends forwardly from and is fixed to the frame part 15. At its outer end portion, the bore of this tube is enlarged to provide a thimble 27 to receive the hook-like tangs T of the commutator C of an armature core assembly gripped by the collet. Although the lengthwise position of the tube 26 must be adjustable to assure its outer end being properly positioned with respect to a particular size armature core, it has no movement — either axial or rotatable — in the performance of its function.

As best seen in FIGS. 5, 6, 12 and 13, the thimble 27 has diametrically opposite notches 28 opening to its end to expose two diametrically opposite commutator tangs when a tubular shield 29 encircling the tube 26 is retracted from its operative shielding position in which the open ends of the tube 26 and the shield are coterminous, as in FIGS. 4, 7, 10, 11 and 14.

The tubular shield 29 is axially slidable on the tube 26, but not rotatable. Its rear end is enlarged to fit the adjacent end portion of the tube 26 which is also enlarged to provide a cylinder 30 for a purpose to be described. A collar 31 fixed to the enlarged rear end of the tubular shield has the plunger 32 of an air cylinder 33 fixed thereto (FIG. 1) so that by actuation of the air cylinder, the tubular shield is reciprocated to either project the same to its operative position covering the notches 28 in the thimble or retract it to uncover the notches and expose two diametrically opposite commutator tangs.

Between the outermost tubular element 16 of the collet and the tube 26 is a tubular lead retaining member 34, the front end portion of which receives the commutator of an armature core assembly gripped by the collet. The extreme front end of the lead retaining member is tapered so as to enter the hook-like tangs T upon outward projection thereof to its operative position and in said position holds leads that have been attached to the tangs against displacement. FIG. 3 illustrates this function of the retaining member. The retaining member is projected to its operative position by pressure fluid in the cylinder 30 and is retracted by a spring 35.

Not only does the tubular shield 29 coact with the thimble 27 to control exposure of the commutator tangs for the attachment of wire leads thereto, but it also coacts therewith to sever the starting and ending leads of the armature winding from the stretch of wire of which they were formed at the start and conclusion of the winding operation. For this purpose, the shield has two diametrically opposite hooks 36 projecting from its outer end to protrude beyond the end of the thimble when the shield is in its projected operative position. Each hook has a notch 37 in one side thereof to receive one of the leads to be cut. The rearwardly facing surface of these notches provide sharp edges which coact with the circular edge formed by the junction of the end surface of the thimble with its cylindrical outer surface, to effect a shearing action upon retraction of the shield. In this manner, the wires in the notches are severed; the manner in which they are engaged in the notches will be described later.

At this point, it should be observed that the hooks 36 lie in a vertical plane containing the axis of the armature core assembly in position to be wound and hence are equispaced from the planes defined by the orbits of the flyers, whereas the notches 28 in the thimble lie in a horizontal plane that also contains the armature core axis. The presence of the hooks 36 therefore does not interfere with the winding of the coil since the stretches of wire extending from the flyers to the core simply slide along the opposite sides of the tubular shield.

The wire gripping means of this invention comprises a pair of tubular fingers 40 mounted above and beneath the combined core gripping, core rotating and commutator shielding unit 14. The mounting of each finger 40 includes a stationary bracket 41 fixed to and projecting from the stationary part 15 and an air cylinder 42 pivoted, as at 43, to the bracket. The finger 40 is fixed to and projects from the air cylinder so that by swinging the cylinder about its pivotal connection with the bracket, the outer free end of the finger can be moved towards and from the axis of an armature core assembly in position to be wound. Such swinging movement is produced by an actuating cylinder 44 connected between the bracket and the cylinder 42. In FIG. 1, the fingers 40 are at the outermost extremities of their range of swinging motion. In their innermost positions, the ends of the fingers are directly adjacent to the top and bottom of the outer end portion of the tubular shield, as shown in FIGS. 4–7. Each finger 40 has a notch 45 in the side thereof facing the orbit of its respective flyer to receive a wire to be gripped. The axially inwardly facing side 46 of this notch coacts with the flat end 47 of a plunger 48 that is reciprocable in the tubular finger to grip a wire received in the notch. The plunger is connected to the piston of the cylinder 42 so that by selectively pressurizing the opposite ends of the cylinder 42, the plunger can be projected to grip a wire or retracted to release the wire.

Briefly considering the procedure involved in beginning the winding of an armature and in terminating the winding operation, and confining the description to only one of the two flyers, reference is first made to FIGS. 4–7. As shown in FIG. 4, an unwound armature core assembly is in position in the machine in place of the armature that had just been wound and removed from the machine. The end of the stretch of wire coming from the flyer 10 is in the grasp of the wire gripping finger 40, which is in its innermost position contiguous to the adjacent hook 36 on the tubular shield. The wire is in the grasp of the gripping finger as a result of the conclusion of the preceding winding operation, and hence the extreme end portion of the wire projects from the gripping finger. The tubular shield is in its projected operative position.

The flyer is now rotated in the winding direction, designated by the arrow W in FIG. 4, to carry the wire to its position shown in FIG. 5, at which time the shield is retracted to expose one of the commutator tangs and the tubular retaining member 34 is retracted to afford access to the exposed tang. The flyer is then rotated in the reverse direction and, as a result, the wire hooks itself onto the exposed tang, as shown in FIG. 6.

Attention is directed to the fact that the tang onto which the wire has hooked itself is spaced a distance from the gripper finger 40 and especially from its grasp on the end of the wire. As will be later described, it is this distance that defines the length of wire that will be wasted.

After the condition shown in FIG. 6 is reached, the tubular shield is advanced to its operative position covering all of the tangs, and the lead retaining member 34 is projected to its operative position to hold the wire against detachment from the tang onto which it hooked itself.

With the shield covering the tangs, the flier is again rotated in the winding direction towards its position shown in FIG. 7, and during this interval the wire wraps itself around the tang and forms the desired alpha-type attachment shown in FIG. 9.

Figure 10:
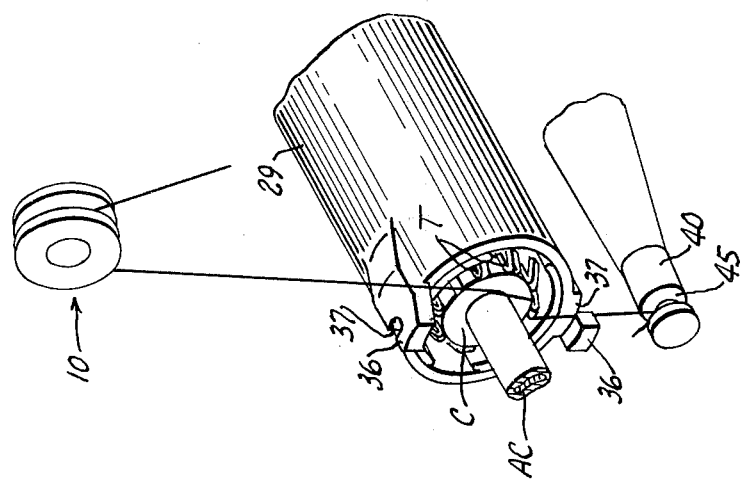
FIG. 10 (on sheet 5) is a perspective view similar to FIGS. 4–7, but showing how the starting lead is brought into position to be severed.

The next event in the sequence takes place while the flyer is at rest in its position shown in FIG. 7. It consists of imparting rotation to the armature core assembly (in the clockwise direction in FIG. 7) by means of the collet gripping its shaft. Such rotation carries the core towards the position it is to occupy during the winding of the first coil. As the core is rotated, the tang to which the wire is attached moves towards the bottom one of the two hooks 36 and the gripper finger 40 moves downward to keep tension on the short stretch of wire which extends from the finger to the tang. The net result of these motions is entry of this stretch of wire into the notch 37 of the hook (as shown in FIG. 10) in preparation for severance of the starting lead from the wire in the grasp of the gripper finger 40 by retraction of the shield. This severance of the starting lead from the wire of which it was formed and which is being held by the gripper finger, in nowise affects the attachment of the starting lead to the tang since, at this time, and until the winding of the first coil is well along, the lead retaining member 34 securely holds the alpha-type attachment of the wire to the tang.

Since the cut is made at the edge of the thimble 27 (FIG. 3) the stub of wire which is left protruding from the tang is very short and needs no further trimming. Also, the length of wire left in the grasp of the gripper finger 40 is relatively short, being only as long as the arcuate distance the tang travels during approximately 90° of rotation of the core, plus the length of wire in the grasp of the gripper finger. That short piece of wire is all that is wasted, but it is retained in the grasp of the gripper finger until the winding operation is finished, to preclude its becoming entangled with the wire being wound onto the core.

Directly after the starting lead is severed from the piece of wire held by the gripper finger, the indexing rotation of the core is resumed and, since the cutting takes but a fraction of a second, it may be said that the cutting occurs during a momentary interruption of the indexing rotation.

Preferably, as already indicated, the retaining member 34 remains in its operative projected position until the winding of the first coil is well along, at which time the member 34 is retracted to remain inoperative and unneeded until the starting sequence of the next to be wound armature core takes place.

FIGS. 11–14 illustrate difference stages in the termination of the ending lead. In FIG. 11, the winding of the last coil has been completed and the flyer is stopped with the stretch of wire leading from it to the core extending tangentially across one side of the armature shaft and across the end of the thimble 27 and the tubular shield 29. The gripper finger 40 with the short piece of wire that will be wasted in its grasp, occupies its position farthest from the tubular shield — that is, its lowermost position. It will remain in that position and retain its grasp upon the short piece of wasted wire until just before the ending lead is to be severed from the stretch of wire leading from the flyer.

In FIG. 12, the shield is retracted to expose the commutator tang then opposite the notch 28 in the thimble. Now clockwise rotation is imparted to the core and, by this rotation, the selected commutator tang is brought into line with the notch 28 so that, upon reverse rotation of the flyer, the wire hooks itself onto the selected tang, as shown in FIG. 13.

The shield is now advanced to cover the tangs and bring the wire cutting hook 36 into its potentially operative position, and the gripper finger 40 is actuated to bring the same to its position contiguous to the hook 36, and opened to drop the piece of wire it had been holding. Since both the notch 37 in the hook and the notch 45 in the gripper finger 40 face in the same direction — namely, towards the orbit of the flyer — and since the plunger 48 of the gripper finger is retracted, further rotation of the core (in the clockwise direction) carries the stretch of wire leading from the flyer to the core into the notch 37 of the hook and also into the notch 45 in the free end of the finger 40.

With the flyer stationary, the plunger in the finger 40 is projected to grip the wire that is now in the notch of the finger, and then - with the wire gripped - the shield is retracted to sever the wire very close to the tang from which it extends. The wound armature can now be taken from the machine, to be replaced by the next armature core assembly to be wound.

Those skilled in the art will appreciate that the invention can be embodied in forms other than as herein disclosed for purposes of illustration.

The invention is defined by the following claims:

I claim:

1. In a machine for winding coils of wire onto slotted armature cores and looping the lead wires of the coils around the hook-like tangs of commutators associated with the armature cores, the combination of:
  A. core gripping means to hold an armature core assembly while wire is being wound onto its core;
  B. a tubular shield axially movable to and from a projected position in which an end portion thereof enshrouds and covers the hook-like tangs of the commutator associated with an armature core held by said core gripping means;
  C. a tubular lead wire retaining member inside said tubular shield,
    said lead wire retaining member having an inner end and an outer end and being axially movable with respect to said tubular shield to and from an operative position so positionally related to the core gripping means that while in said position its outer end portion receives the commutator of an armature core assembly held by said core gripping means;
  D. means on the outer end portion of said tubular lead wire retaining member to project into the hook-like tangs of a commutator received in the retaining member to engage any wire lead that has been looped around a tang and by such engagement hold the lead against displacement from the tang; and
  E. drive means operatively connected with said tubular retaining member for effecting movement thereof to and from its operative position.

2. The structure set forth in claim 1, wherein said core gripping means comprises a collet into which projects the end portion of the shaft of an armature core assembly being held by the core gripping means, said collet having inner and outer telescoped elements which coact to grip the shaft of the armature core assembly;
and wherein said tubular lead wire retaining member telescopically receives the outer one of said telescoped elements.

3. In a machine for winding coils of wire onto slotted armature cores and hooking the lead wires of the coils onto the hook-like tangs of commutators associated with the armature cores, the combination of:
  A. core gripping means to hold an armature core assembly while wire is being wound onto its core;
  B. a tubular shield axially movable to and from a projected position in which an end portion thereof enshrouds and covers the hook-like tangs of the commutator associated with an armature core held by said core gripping means;
  C. a tubular lead wire retaining member inside said tubular shield;
  D. means mounting said lead wire retaining member for axial movement relative to the tubular shield to and from an operative position encircling the commutator associated with an armature core held by said core gripping means;
  E. lead wire engaging means on said lead wire retaining member positioned when the latter is in said operative position to enter into the hook-like tangs of said commutator and engage any wire lead that has been hooked onto a tang and by such engagement hold any such wire lead against displacement from its respective tang; and
  F. drive means operatively connected with said tubular lead wire retaining member to move the same to and from its operative position.

4. The structural combination defined in claim 3, wherein said lead wire engaging means is a cylindrical end portion of said tubular lead wire retaining member, the outer surface of which is taperingly reduced in diameter to facilitate its entry into the hook-like tangs.

5. The structural combination defined in claim 3, wherein said core gripping means comprises a collet having inner and outer telescoped members which coact to grip the shaft of an armature core assembly and thereby hold the same in winding receiving position;
  and wherein said tubular lead wire retaining member telescopically encircles the outer one of said telescoped members.

6. The structural combination defined in claim 3, further characterized by:
  A. a tubular thimble to telescopically receive the commutator, said thimble being the outer end portion of a fixedly mounted tube and having tang exposing notches in its outer edge;
  B. wherein said tubular shield is telescopically slidable on said fixedly mounted tube for movement between a projected position covering all of the tangs of a commutator in the thimble, and a retracted position coacting with the notches in the thimble to expose certain of said tangs; and
  C. wherein said tubular lead wire retaining member is slidably received in said fixedly mounted tube.

* * * * *